United States Patent [19]
Apollonio et al.

[11] Patent Number: 5,611,970
[45] Date of Patent: Mar. 18, 1997

[54] METHOD OF CAST MOLDING TORIC CONTACT LENSES

[75] Inventors: Attilio Apollonio, Livonia; Paul M. Erickson, Kent, both of N.Y.

[73] Assignee: Bausch & Lomb Incorporated, Rochester, N.Y.

[21] Appl. No.: 484,046

[22] Filed: Jun. 7, 1995

Related U.S. Application Data

[63] Continuation of Ser. No. 189,351, Jan. 31, 1994, abandoned.

[51] Int. Cl.⁶ .................................................. B29D 11/00
[52] U.S. Cl. ............................................. 264/2.5; 425/808
[58] Field of Search ............................ 264/1.7, 1.8, 2.5; 425/808

[56] References Cited

U.S. PATENT DOCUMENTS

| | | | |
|---|---|---|---|
| 3,632,696 | 1/1972 | Jones . | |
| 3,946,982 | 3/1976 | Calkins | 249/102 |
| 4,208,365 | 6/1980 | LeFevre | 425/808 |
| 4,383,672 | 5/1983 | Kreuttner | 249/134 |
| 4,407,766 | 10/1983 | Haardt et al. | 425/808 |
| 4,522,768 | 6/1985 | Roscrow | 264/2.2 |
| 4,680,998 | 7/1987 | Council . | |
| 4,749,530 | 6/1988 | Kunzler | 264/2.7 |
| 5,110,278 | 5/1992 | Tait | 425/175 |
| 5,147,585 | 9/1992 | Blum | 264/1.7 |
| 5,200,121 | 4/1993 | Hagmann | 264/1.8 |
| 5,252,056 | 10/1993 | Horner | 425/555 |
| 5,271,875 | 12/1993 | Appleton | 264/2.3 |

FOREIGN PATENT DOCUMENTS

| | | |
|---|---|---|
| 1374881 | 10/1964 | France . |
| 2356911 | 5/1975 | Germany . |

*Primary Examiner*—Mathieu D. Vargot
*Attorney, Agent, or Firm*—Katherine McGuire; John E. Thomas

[57] ABSTRACT

A method of cast molding toric contact lenses having a toric posterior surface permits aligning the mold sections at multiple rotational positions.

7 Claims, 1 Drawing Sheet

METHOD OF CAST MOLDING TORIC CONTACT LENSES

This is a continuation of application Ser. No. 08/189,351 filed on Jan. 31, 1994, now abandoned.

BACKGROUND OF THE INVENTION

This invention relates to a method of cast molding toric contact lenses.

Contact lenses having a toric optical zone (commonly referred to as "toric contact lenses") are used to correct refractive abnormalities of the eye associated with astigmatism. The toric optical zone provides cylindrical correction to compensate for the astigmatism. Since astigmatism requiring vision correction is usually associated with other refractive abnormalities, such as myopia (nearsightedness) or hypermetropia (farsightedness), toric contact lenses are generally prescribed also with a spherical correction to correct myopic astigmatism or hypermetropic astigmatism. Currently, both back toric lenses (having the toric surface formed in the posterior lens surface) and front toric lenses (having the toric surface formed in the anterior lens surface) are available.

Whereas spherical contact lenses may freely rotate on the eye, toric contact lenses have a ballast to inhibit rotation of the lens on the eye so that the cylindrical axis of the toric zone remains generally aligned with the axis of the astigmatism. For example, a section of the lens periphery may be thicker (or thinner) than another section to provide the ballast. Toric contact lenses are manufactured with a selected relationship (or offset) between the cylindrical axis of the toric optical zone and the orientation of the ballast. This relationship is expressed as the number of degrees (rotational angle) that the cylindrical axis is offset from the orientation axis of the ballast.

Toric contact lenses, similar to spherical contact lenses, are usually offered in several different base curves, a lens parameter related to fitting characteristics of the lens, and several different spherical powers. Toric contact lenses, however, not only include the toric optical zone and ballast, but the lenses are offered with a range of cylindrical axis orientations in order to accommodate patients with different astigmatic conditions; for example, for a given base curve and spherical power, the cylindrical axis may be offered in 5 or 10 degree increments ranging from 0° to 180°. Toric contact lenses are often referred to as a "specialty lens" product line; many individual prescriptions are offered, and the number of individual lenses manufactured, for an individual prescription, is very small when compared to spherical contact lenses.

Various methods are used for manufacturing contact lenses. The majority of toric contact lenses are produced by lathing a button (or lens blank), or a semi-finished button (containing one finished surface). See, for example, U.S. Pat. No. 4,680,998 (Council, Jr.).

Another method known, in general, for manufacturing contact lenses is cast molding. Cast molding of contact lenses involves depositing a curable mixture of polymerizable monomers in a mold cavity formed by two mold sections, curing the monomer mixture, and disassembling the mold assembly and removing the lens. Other processing steps, for example, hydration in the case of hydrogel lenses, may also be employed. One mold section forms the anterior lens surface (anterior mold section), and the other mold section forms the posterior lens surface (posterior mold section).

Prior to the cast molding of the contact lens, each of the mold sections is formed by injection molding a resin in the cavity of an injection molding apparatus. Mounted in the injection molding apparatus are tools for forming the optical surface on the mold sections. Whereas the mold sections are typically used only once for casting a lens, the injection molding tools are used to make hundreds of molds. The tools must be manufactured to extremely high specifications so that no roughness or surface defects are transferred to the mold section being made therefrom, as any such defects on the mold surface would be transferred to the molded contact lens. The tools are typically made from brass, stainless steel, nickel or some combination thereof.

Several known cast molding methods have the potential to mold a finished contact lens. As an example, U.S. Pat. No. 5,271,875 (Appleton et al.) discloses such a cast molding method. Since these methods avoid time-consuming and labor-intensive operations such as lathing, the methods have been found to offer the potential to reduce production time and cost for the manufacture of spherical contact lenses.

However, various problems have been encountered in employing cast molding technology for manufacturing toric contact lenses.

If one wished to manufacture a toric contact lens product line by cast molding, the number of unique tools that must be designed, manufactured and stocked is significantly high. For example, assuming that, for a given base curve and optical power, toric contact lenses are offered with cylindrical axes offset from the ballast in 10-degree increments ranging from 0 to 180 degrees, the number of sets of tools for producing the sets of anterior and posterior mold sections would be on the order of 18 times greater than needed for spherical contact lenses of the same base curve and power. These considerations are further complicated by the fact that for toric contact lenses, the demand for an individual prescription is much lower than for spherical lenses.

U.S. Pat. No. 5,252,056 (Horner et al.) discloses a contact lens cast molding method employing two mold halves. When the two mold halves are joined together, vertical rib-like fixing elements on one mold half and a cylindrical projecting extension on the other mold half adhere to each other solely by frictional contact. The disclosure mentions that the two mold halves can be joined together only in a very specific orientation relative to each other, whereby toric contact lenses can be manufactured. While this approach may permit alignment of the two mold sections at a specific orientation, the number of sets of tools required to cast mold a toric lens product line would remain significantly high.

SUMMARY OF THE INVENTION

The invention provides a method of cast molding a toric contact lens including a posterior toric central zone having a cylindrical axis, and an anterior lens surface forming a ballast that has an axis of orientation offset from the cylindrical axis at a selected rotational angle.

The method comprises: providing anterior and posterior mold sections including respective anterior and posterior mold cavity defining surfaces, wherein the posterior mold cavity defining surface includes a toric central zone and the anterior mold cavity defining surface is shaped to provide ballast, the mold sections being alignable at multiple rotational positions; adjusting rotational alignment of the anterior and posterior mold sections with respect to one another to align the mold sections at a rotational position corresponding to said selected rotational angle, and assembling said anterior and posterior mold sections at said corresponding rotational position to form a lens-shaped molding cavity therebetween; and curing a polymerizable lens-forming mixture in the lens-shaped cavity of the assembled mold sections to form the toric contact lens.

The method ensures that the two mold sections are aligned at a specific rotational position so that the cylindrical axis and ballast of a toric contact lens molded therein are offset at the selected rotational angle. Additionally, since the mold sections are alignable at multiple rotational positions, the same types of mold sections can be used to mold toric contact lenses with different axes offsets, thereby reducing significantly the number of unique tools that must be designed, manufactured and stocked.

DETAILED DESCRIPTION OF PREFERRED EMBODIMENTS

Figure 1:
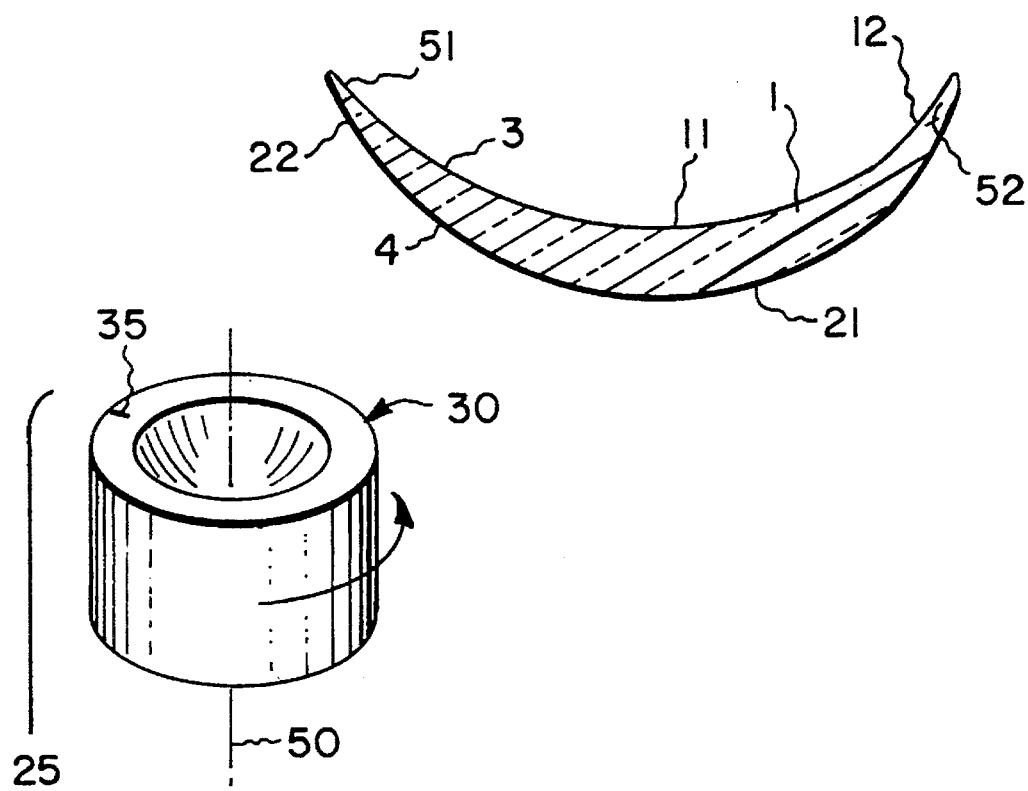
FIG. 1 is a schematic cross-sectional view of a toric contact lens.

FIG. 1 schematically illustrates a representative toric contact lens 1 that may be produced by the method of this invention.

Central zone 11 of posterior surface 3 is toric, i.e., this zone has a toric surface that provides the desired cylindrical correction. Posterior surface 3 may optionally include at least one peripheral curve 12 surrounding the central toric zone 11. For the described embodiment, central zone 21 of anterior surface 4 is spherical, and the spherical curve is matched with central zone 11 to provide the desired spherical correction to the lens. Anterior surface 4 may optionally include at least one peripheral curve 22 surrounding central zone 21.

Lens 1 is provided with ballast so that the lens maintains a desired rotational orientation on the eye. For example, as schematically shown in FIG. 1, peripheral section 51 may have a different thickness than an opposed peripheral section 52 of the lens periphery. As is known in the art, the ballast is oriented about an axis, and toric contact lens prescriptions define the offset of this axis from the cylindrical axis by a selected rotational angle (usually expressed as number of degrees). As used herein, the term "offset" is inclusive of rotational angles of 0 degrees or 180 degrees, wherein the cylindrical axis is coincident with the ballast axis.

Figure 2:
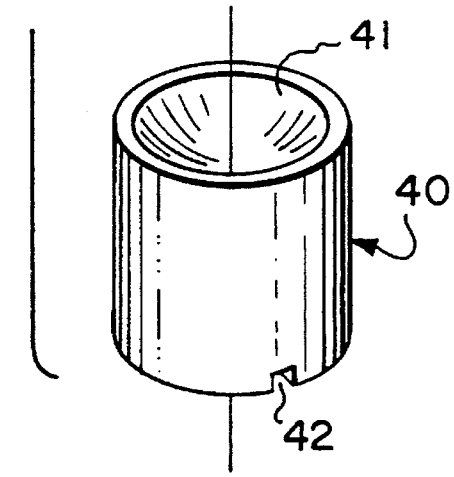
FIG. 2 is a schematic exploded view of a mold assembly.
Figure 3:
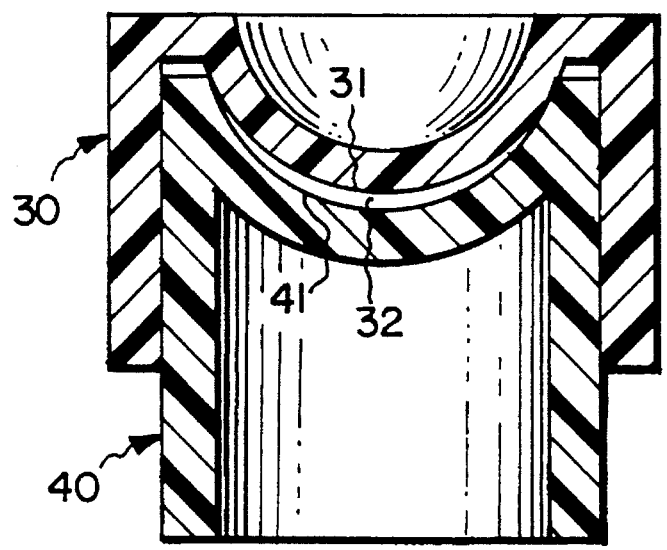
FIG. 3 is a schematic cross-sectional view of an assembled mold assembly.

A representative mold assembly 25 for the method of this invention is shown in FIGS. 2 and 3. The mold assembly includes posterior mold 30 having a posterior mold cavity defining surface 31 (which forms the posterior surface of the molded lens), and anterior mold 40 having an anterior mold cavity defining surface 41 (which forms the anterior surface of the molded lens). Each of the mold sections is injection molded from a plastic resin in an injection molding apparatus.

When the mold sections are assembled, a mold cavity 32 is formed between the two defining surfaces that corresponds to the desired shape of the contact lens molded therein. Accordingly, for the method of this invention, posterior mold cavity defining surface 31 has a toric central zone (for forming the toric posterior surface of the toric contact lens) having a cylindrical axis, and anterior mold cavity defining surface 41 has a configuration that will provide ballast to a lens molded in molding cavity 32. Of course, surfaces 31, 41 may also include curves for forming desired peripheral curves on the lens, and the central zones of surfaces 31, 41 may be designed to provide a desired spherical correction to the molded toric lens.

In cast molding spherical contact lenses from a mold assembly composed of posterior and anterior mold sections, the two mold sections can be assembled without regard to relative rotational positions of the mold sections, since the mold cavity defining surfaces of both mold sections have only spherical curves. However, if the mold sections for molding toric contact lenses were positioned or assembled in such a "random" manner, a "random" offset between the cylindrical axis and ballast would result. Such an approach for cast molding toric contact lenses would be impractical, as it offers no predictability as to the final molded product.

A potential alternate approach would be to design a unique set of posterior and anterior mold sections for any individual prescription (based on base curve, spherical correction, cylindrical correction and offset), wherein the mold sections in any set may only be joined (or fit) together at one position. While this approach may offer the potential to avoid the aforementioned random positioning of the mold section with respect to one another, the number of unique tools that would need to be designed, manufactured and stocked for a toric lens product line would be significantly high.

The present invention addresses the problems attributed to cast molding toric contact lenses. First, the rotational alignment of the anterior and posterior mold sections can be adjusted to correspond with the selected offset between the cylindrical axis and the ballast, thus avoiding the random relative positioning of the mold sections. Second, the same types of anterior and posterior mold sections can be aligned at multiple rotational positions. Accordingly, the same types of anterior and posterior mold sections can be used to mold toric lenses with different axes offsets, thereby reducing significantly the number of unique tools needed.

As an example, as shown schematically in FIG. 2, after depositing a curable mixture of polymerizable monomers in anterior mold section 40, posterior mold section 30 may be rotated about axis 50 until alignment of this mold section is adjusted with respect to anterior mold section 40 at the selected rotational position. The mold sections are then assembled, or brought fully together, to assume the configuration shown in FIG. 3 while maintaining the selected rotational position. Alternately, anterior mold section 40 may be rotated about axis 50 until alignment is adjusted at the selected rotational position, followed by assembling the mold sections while maintaining the selected rotational position.

One manner of ensuring the desired rotational positioning of the mold sections will be described with reference to the embodiment illustrated in FIG. 2. Anterior mold section 40 may include a notch 42 which is engageable with a protrusion on a support member of the cast molding system, thereby ensuring that anterior mold section 40 can be aligned at a known position with respect to the support member. Posterior mold section 30 may include one or more detectable indicia 35, whereby the rotation of posterior mold section 30 about axis 50 can be detected and controlled. After rotating posterior mold section 30 about axis 50 until alignment of the mold sections is adjusted at the selected rotational position, the mold sections are assembled while maintaining the selected rotational position.

As a variation of this embodiment, the posterior mold section may include a notch, and the anterior mold section may include one or more indicia.

Another manner of ensuring the desired rotational positioning of the mold sections will be described. The support member for anterior mold section 40 may be rotatable, wherein notch 42 of anterior mold section 40 is engageable with its rotatable support member. After detecting the position of the posterior mold section with detectable indicia 35, the anterior mold section and its support member can be rotated about axis 50 until the selected rotational position is obtained, whereby the mold sections are assembled while maintaining the selected rotational position.

Variations of this embodiment are evident. For example, the anterior mold member and its support may be rotatable only in fixed increments of 5 degrees or 10 degrees.

According to further variations of the described embodiments, both the anterior and posterior mold sections may include detectable indicia at a known position on the mold sections, or both mold sections may include a notch at a known position. Other variations and embodiments that permit adjusting rotational alignment of the two mold sections at multiple positions are within the scope of the invention as would be evident to one skilled in the art.

Subsequent to assembling the mold sections, the monomer mixture is polymerized, such as by exposure to UV light or heat, followed by disassembling the mold assembly and removing the molded lens therefrom. Other processing steps which may be included, depending on the specific process, include lens inspection, hydration in the case of hydrogel contact lenses, and lens packaging.

The posterior and anterior mold sections are injection molded by methods known in the art. The tools for the injection molding are typically made from brass, stainless steel or nickel or some combination thereof. After machining the desired surface on the tools, the tools are polished to achieve precision surface quality so that no surface imperfections are transferred to the mold section being injection molded therefrom.

The tool for the injection molding of the posterior mold section has a concave toric surface for forming the toric surface on the posterior mold section. After machining the toric surface on this tool, care should be taken to avoid "overpolishing" the machined concave toric surface, i.e., since this surface is not spherical, the polishing operation may undesirably remove portions of the toric surface.

Overpolishing can be minimized by employing a polisher that is sufficiently rigid to polish off machine marks from the tool surface, but sufficiently deformable that curves on the tool surface are not altered. A suitable polisher is a dome-shaped polisher head formed of a silicone polymer (Silastic E RTV, Dow Corning) and mounted on a polishing spindle. The dome-shaped polisher head has a size which generally corresponds to the tool surface being polished. During polishing, a polishing compound, such as an aqueous abrasive composition, is applied to the polisher head, and the polisher head is rotated with respect to the tool surface. Preferably, both the dome-shaped polishing head and the tool are mounted on rotatable spindles so that during the polishing operation, the rotation of the two elements can be optimized.

A further advantage of the method of this invention is that it permits practical and cost effective cast molding of toric contact lenses having more complicated geometry, especially multifocal toric contact lenses.

For this embodiment, the toric contact lens has an anterior multifocal surface. Accordingly, both the multifocal optics and the ballast are "built into" the anterior surface of the lens.

For purposes of illustration, multifocal contact lenses can be divided into two classes.

First, multifocal lenses include those which are radially symmetric about a diameter of the lens, such as concentric bifocal contact lenses. For cast molding this class of toric multifocal contact lenses by the present invention, mold defining surface 41 of the anterior mold section 40 is shaped to provide the multifocal optical surface in addition to providing ballast. The anterior mold sections are injection molded from injection molding tools having this desired optical surface by conventional methods.

Second, multifocal lenses include those which are not radially symmetric, such as translating multifocal contact lenses, or lenses including distinct near and far vision zones. Lenses in this class generally must maintain a specific orientation on the eye to achieve proper multifocal vision. Accordingly, for cast molding this latter class of toric multifocal contact lenses, mold defining surface 41 is provided with the desired multifocal optical surface, as discussed above, and surface 41 is also designed so that the multifocal optical surface thereon is oriented with respect to the ballast provided in surface 41. Since both the multifocal optics and the ballast are provided by the anterior mold section, the posterior and anterior mold sections may still be rotationally aligned at multiple rotational positions.

Although certain preferred embodiments have been described, it is understood that the invention is not limited thereto and modifications and variations would be evident to a person of ordinary skill in the art.

What is claimed is:

1. A method of cast molding a toric contact lens including a posterior toric central zone having a cylindrical axis, and an anterior lens surface forming a ballast that has an axis of orientation offset from said cylindrical axis at a selected rotational angle, said method comprising:

providing anterior and posterior mold sections including respective anterior and posterior mold cavity defining surfaces, wherein the posterior mold cavity defining surface includes a toric central zone and the anterior mold cavity defining surface is shaped to provide the ballast, said mold sections being alignable at multiple rotational positions;

adjusting rotational alignment of the anterior and posterior mold sections with respect to one another to align the mold sections at a rotational position corresponding to said selected rotational angle, and assembling said anterior and posterior mold sections at said corresponding rotational position to form a lens-shaped molding cavity therebetween, and curing a polymerizable lens-forming mixture in the lens-shaped cavity of the assembled mold sections to form the toric contact lens.

2. The method of claim 1, wherein one of the mold sections is rotated until the mold sections are aligned at said corresponding rotational position, and thereafter the mold sections are assembled while maintaining said corresponding rotational position.

3. The method of claim 1, wherein the mold sections are maintained at said corresponding rotational position throughout curing.

4. The method of claim 1, wherein the mold sections are alignable only at rotational positions incrementally varying by 5 degree or 10 degree increments.

5. The method of claim 1, wherein the mold sections are alignable at any rotational position.

6. The method of claim 1, wherein the anterior mold cavity defining surface further includes a spherical central zone.

7. The method of claim 1, wherein the anterior mold cavity defining surface further includes a multifocal central zone.

* * * * *